United States Patent [19]

Weber

[11] Patent Number: 5,477,445

[45] Date of Patent: Dec. 19, 1995

[54] PROCESS AND DEVICE FOR BI-DIRECTIONAL DATA EXCHANGE BETWEEN COMPUTER AND/OR CONTROL SYSTEMS

[75] Inventor: Fritz Weber, Wettingen, Switzerland

[73] Assignee: Prolink AG, Seengen, Switzerland

[21] Appl. No.: 315,494

[22] Filed: Sep. 30, 1994

Related U.S. Application Data

[63] Continuation of Ser. No. 119,176, filed as PCT/CH93/00023, Jan. 23, 193, published as WO93/15451, Aug. 5, 1993.

[30] Foreign Application Priority Data

Jan. 31, 1992 [CH] Switzerland ............................ 00291/92

[51] Int. Cl.$^6$ .................................................. G05B 15/00
[52] U.S. Cl. ............................................ 364/188; 364/146
[58] Field of Search ..................................... 364/188–194, 364/474.22–474.27, 131–144, 146

[56] References Cited

U.S. PATENT DOCUMENTS

| | | | |
|---|---|---|---|
| 4,370,717 | 1/1983 | Hummert et al. | 364/436 |
| 4,870,561 | 9/1989 | Love et al. | 364/192 |
| 4,956,790 | 9/1990 | Tsuchihashi et al. | 364/188 |
| 5,046,022 | 9/1991 | Conway et al. | 364/190 |
| 5,101,363 | 3/1992 | Rutkowski | 364/474.24 |
| 5,168,441 | 12/1992 | Onarheim et al. | 364/188 |
| 5,274,574 | 12/1993 | Tsujido et al. | 364/474.24 |
| 5,276,811 | 1/1994 | Zifferer et al. | 364/191 |

Primary Examiner—James P. Trammell
Attorney, Agent, or Firm—Finnegan, Henderson, Farabow, Garrett & Dunner

[57] ABSTRACT

For the purpose of a virtual reduction of the transmission time in real-time data exchange between computer and/or control systems without loading the communications COM a prediction is produced as simulated image for the duration of the transmission time of the real-time data image MEM of the operating station to be changed and the change is carried out in the simulated image at the same time as the input, while the background information is fed to the target system and immediately returned as a new real-time data image. The corresponding addresses of the real-time data image can be used for the storage addresses of the simulated image for a faster response. In addition, transmission and reception information may travel via the same path and also to identical storage addresses in the receiving control system. To relieve communications, a multiplexer program may be included in the transmission path and the data can also be guided via a decoder DEC and encoder ENC program for data conversion or compression, a multiple decoder/encoder program with input/output interfaces I/O for a plurality of planes or levels providing further relief.

16 Claims, 8 Drawing Sheets

PROCESS AND DEVICE FOR BI-DIRECTIONAL DATA EXCHANGE BETWEEN COMPUTER AND/OR CONTROL SYSTEMS

This application is a continuation of application Ser. No. 08/119,176 filed as PCT/CH93/00023, Jan. 23, 1993, published as WO93/15451, Aug. 5, 1993, now abandoned.

BACKGROUND OF THE INVENTION a) Technical Field

The invention is directed to a process and a device for bidirectional data exchange between computer and/or control systems in which an existing real-time data image is changed via an input and is preferably visualized.

b) Background Art

Such processes are particularly suitable in the area of visualization and control system technology where data images are displayed with real-time behavior and influenced by the operator. They are of great practical importance in that they enable an efficient, process-oriented operation of computer-linked systems with low-cost, commercially available transmission devices with a simultaneous simplification of the necessary transmission procedures and improved use of existing transmission capacities.

Processes for bidirectional data exchange between computer and/or control systems in which either the transmission speed is increased or certain data are processed as preferred data (priority control) are already known. Processes for fast on-screen response in which the operator is essentially notified of an ensuing waiting period for processing his input (local echo) are also known. Current trends generally tend toward higher-capacity systems (fiber optics, multi-processors) with increasingly shorter processing and response times. Not only is it burdensome for the operator to wait for his input to be processed, but this often impedes real-time behavior and thus hampers practical management of a process, particularly in simpler computer systems. Often, the problem is not one of slow data traffic, but the simple fact that a normally fast network is momentarily overloaded and the system cannot give the operator a response within the expected time period.

For this reason the increased use of computer-linked and networked systems demands increasingly higher transmission capacities which can presently be achieved only with the most modern technology (hardware), with complicated transmission procedures (firmware, software) or with a considerable expenditure on data management. In spite of advanced techniques, the use of the most up-to-date technology in smaller and middle-sized installations is often not financially feasible. As a rule, priority-controlled transmissions are dependent on the manufacturer, are usually not open and, if not already commercially available, are likewise too expensive. However, such transmissions represent a drain on the overall transmission capacity of a system, since the more costly transmission procedure must be processed additionally although the given average transmission speed is not increased.

OBJECT AND SUMMARY OF THE INVENTION

The primary object of the invention is to provide a virtual reduction in the transmission time in bidirectional data exchange with currently available transmission systems, in particular to achieve a system response with real-time behavior enabling a practical handling of a process on the part of the operator, in which real-time data images of computer and/or control systems can be changed and existing transmission procedures can be employed.

This is achieved according to the invention in that a simulated image is produced from the real-time data image within the scope of input, particularly during the transmission period, and the change is carried out in the simulated image at the same time as the input.

The invention aims at imaging real-time data (responses, reference values) which can also be generated from another location (e.g. the control system) in the local system in conformity with the process as a matter of course and at simulating them for a brief period during the transmission only in the case of a command. Thus, by striking a key the operator sees the requested status on the screen without having to wait for the command transmission time or the actual answer from the system. The simulation or forecast of the real-time data image produces the fastest possible command reaction of the system with the advantage that communication need not be impeded in the event of a command. Accordingly, a corresponding priority control is dispensed with and full communication capacity is available for an optimized total data throughput.

Another advantage consists in the increased operating convenience provided by the simulation: there is no waiting for the processing of an input; the operator can immediately execute the next action at any time as he sees fit and can accordingly also execute rapid operating sequences or work more efficiently.

The process according to the invention allows various modes. Thus, regardless of the ACTUAL operating parameters, a change in the operating parameters in response to the control commands can be simulated, particularly for the duration of the transmission, with the anticipated response or responses of the ACTUAL operating parameters as a prediction in the real-time image in the command/monitoring station at the same time as the input of the control command. In other words, a change in the operating parameters is simulated with the anticipated response as a prediction in the real-time image at the same time as the input. Response can also mean reply (feedback); prediction means forecast, advance notice, prognosis or simulation.

In a further option, a change in the operating parameters in response to the control commands is presented as a simulated image in the command/monitoring station for the duration of the transmission with the anticipated response or responses of the ACTUAL operating parameters as a prediction at the same time as the input of the control commands regardless of the ACTUAL operating parameters. Again, simply expressed, a change in the operating parameters is presented as a simulated image with the anticipated response as prediction at the same time as the input, or a change in the operating parameters with the anticipated response as prediction is presented as a simulated image at the same time as the input.

Further, according to a third option, a change in the operating parameters in response to the control commands is displayed by means of (immediate) simulation of the anticipated ACTUAL operating parameters (in the real-time image) regardless of the ACTUAL operating parameters and is presented (for the duration of the transmission) as a simulated image in the command/monitoring station at the same time as the input of the control commands. In so doing, a change in the operating parameters is displayed by simulating the anticipated ACTUAL operating parameters and is presented as a simulated image at the same time as the input, or a change in the operating parameters is displayed at the same time as the input by simulating the anticipated ACTUAL operating parameters and is presented as a simulated image. For example, the simulated image can be shown in red and the subsequent real-time image after the input has been completely processed in the unit to be controlled can be shown in green.

In another particularly advantageous development of the process for bidirectional data exchange between a command/monitoring station and one or more units to be controlled a) control commands are inputted in the command/monitoring station in a first input/output interface and are passed on to the unit(s) to be controlled; and b) ACTUAL operating parameters of the unit(s) to be controlled are fed back via the first input/output interface to the command/monitoring station to reproduce these ACTUAL operating parameters in real-time characterized in that c) a change in the operating parameters in response to the control commands is simulated in a simulated image in the command/monitoring station at the same time as the input of the control commands regardless of the ACTUAL operating parameters.

With respect to control systems, the invention proceeds in part from the fact that the input of a new adjustment variable for example causes corrections to be made in the processing process which in the majority of cases result in further task sequences with alteration of other data. However, this means that exploiting an increase in the transmission speed taken to its extreme is only relatively effective, since changes in the processing process can only be carried out in completely different or much greater time frames. Of decisive importance is the immediate acknowledgement of an input in the simulated image with the assurance that the control system will automatically execute all follow-up steps correctly in the required time period and will, if necessary, even reject or correct the command with corresponding instructions to the operator or respond with an alarm. Thus, the simulated image is made accessible to the operator for the length of the transmission of information, i.e. for him the response is effected (virtually) in real time depending on behavior, while the background information reaches the target system, from where it is immediately reprocessed as a real-time data image and sent back (bidirectional). The real-time data for the operating station accordingly correspond to an imaging of real-time data in the target system which, as control system, preferably monitors, controls and/or regulates an installation. The operating station is linked to the control system through a conventional apparatus for communication so that real-time data from the control system can be read via a reception channel and written into the control system via a transmission channel bidirectionally. The manner in which transmission is effected (hardware and software) has no bearing on the process and can therefore be selected optionally. Regardless of the inputs or simulations at the operating station, the target or control system can also influence and, if necessary, dominate the real-time data image or parts thereof at any time. After an input at the operating station and expiration of the delay, the real-time data image from the control system is automatically displayed recurrently at the operating station. In this way, a determined real-time data image or partial image can be influenced in two or more independent computer and/or control systems and can be made changeable in real time depending on behavior.

However, the process also allows multi-user applications and does not require any so-called record locking for the real-time data image, since the last or most recent allowed intervention preferably always has validity.

A software program or simulating means for the operating station with a data storage for real-time data for each operable element (data point) is used for the process. The central part of the process is a program part which preferably has individual delay elements for all operating elements. The delay can be adapted automatically so as to correspond to the transmission time for the communication. A change in the data image is detected by this program part via the input/output interface of the operating station. A simulation or prediction of the real-time data image is effected simultaneously with the transmission of the input information in that the changed data are stored as simulated data instead of the real-time data during the delay. In so doing, it is critical that changes brought about by real-time data from the control system do not lead to a simulation, i.e. reception and transmission paths are separated by the program part so that no unwanted feedback can occur. The simulated data, particularly for the changed values, are preferably maintained until the transmission and acknowledgement of the changed real-time data image via the communication are completed.

A more rapid reaction can be achieved by selecting storage addresses for the simulated image which are identical with the storage addresses for the real-time data image. In order to reduce expenditure on data management and thus accelerate processing, data from partial images as well as data from a plurality of images can be processed jointly as a real-time data image. Real-time data can also be progressively updated for invisible background images so that the data are available for access at any time with the fastest possible reaction as a real-time data image. The transmission and reception channels can be effected along the same path with conventional, low-cost communications equipment and the storage addresses of the real-time data in the receiving target system or control system can be identical for the purpose of emulating a so-called dual-port RAM (Random Access Memory) for transmission and reception information.

A multiplexer program can be installed in the transmission path on the transmission side for multi-addressing. The returning received information for the real-time data image need not necessarily be identical with the transmitted information from the simulated image. A decoder/encoder program in the reception and transmission path, respectively, ensures that the information for the real-time data image and simulated image are compressed. Accordingly, data type conversions and/or scaling or normalizing can be carried out simultaneously. A multiple decoder/encoder program with input/output interfaces for a plurality of planes or levels also enables direct simulation of different data formats simultaneously. The multiplexer as well as the decoding and encoding functions provide relief for the communications since the data are accordingly coded, i.e. transmitted in compressed form.

The invention is directed to a device and includes within the scope of the input device a software program which makes it possible to produce a simulated image from the real-time data image particularly during the transmission period and to carry out the change in the simulated image at the same time as the input. The device also enables a number of advantageous options corresponding to the process.

Thus, as a result of the simulating means, a change in the operating parameters in response to the control commands is displayed (for the duration of the transmission) in a simulated image in the command/monitoring station at the same time as the input(s) of the control commands as a prediction of the anticipated ACTUAL operating parameters regardless of the ACTUAL operating parameters. The simulating means represent the change in the operating parameters as a prediction of the anticipated ACTUAL operating parameters in a simulated image at the same time as the input. The simulating means can be designated as simulator and the corresponding apparatus for the simulating function can also be designated as simulating apparatus or simulating device.

According to another option, the simulating means simulate the change in the operating parameters in response to the control commands as a prediction of the anticipated ACTUAL operating parameters (for the duration of the transmission) in the real-time image of the command/monitoring station at the same time as the input(s) of the control commands regardless of the ACTUAL operating parameters. The simulating means simulate a change in the operating parameters as a prediction of the anticipated ACTUAL operating parameters in the real-time image at the same time as the input.

According to another particularly advantageous construction, a device for bidirectional data exchange between a command/monitoring station and one or more units to be controlled, in particular for carrying out the process, with a) a first input/output interface and a data transmission device which are designed to
  a.1) pick up control commands from the command/monitoring station and transmit them to the respective unit(s) to be controlled and
  a.2) for the purpose of real-time response of the ACTUAL operating parameters of the unit(s) to be controlled to the command/monitoring station and is characterized by b) simulating means which simulate a change in the operating parameters in response to a control command in a simulated image in the command/monitoring station at the same time as the inputs of the control commands regardless of the ACTUAL operating parameters.

The simulating means simulate a change in the operating parameters in a simulated image at the same time as the inputs. The central part of the device is a program part which preferably has individual delay elements for all operative elements (data points). The delay can be adapted so as to correspond to the transmission time for the communication. In addition, the device preferably includes a decoder for converting (decoding, scaling) the received real-time data and an encoder for converting back (coding, normalizing) the data to be transmitted. The change in the real-time data image carried out by the operator is preferably effected via a keyboard or with a so-called pointing device and the real-time data image can be displayed on a screen. Real-time data images can be produced for the area of home technology or for industrial installations with real-time data of/for machinery, installations, engines and valves as well as their measuring devices, control devices and regulating devices.

Contrary to current universally common efforts, the present solution with the process described above and with the device used for this process does not lie exclusively in faster or generally higher-capacity systems. On the contrary, the anticipated answer is immediately conveyed to the operator locally (action=reaction) and possibly corrected later (management by exception) if inapplicable or incapable of being executed: that is, if an allowed command is not executed after the permissible response time has expired it is more practical in view of present technology to inform the operator with a corresponding error message than to permit a follow-up command which would only cause the operator to repeat a futile keyboard stroke. On the other hand, impermissible intervention can easily be intercepted before the command is transmitted and can be accompanied by a corresponding error message.

The solution according to the invention is explained in greater detail in the following with reference to a number of embodiment examples.

BRIEF DESCRIPTION OF THE DRAWINGS

FIG. 12 shows an application of the invention according to

FIG. 11 with data flow for the direct decoding/encoding of a nibble for displaying the status of installations on the screen;

DESCRIPTION OF THE PREFERRED EMBODIMENTS

Figure 1:
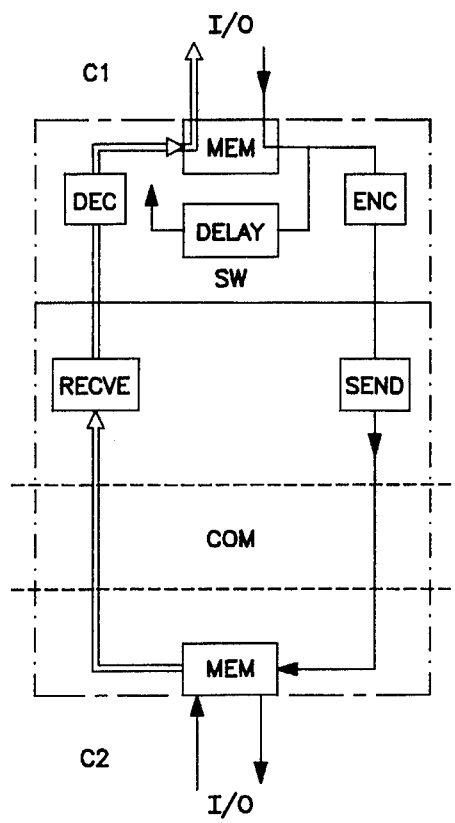
FIG. 1 hows the schematic circuit diagram upon which the invention is based with the most important program elements in the operating station and control system as well as the information data flow (double line) when no input is taking place.
Figure 2:
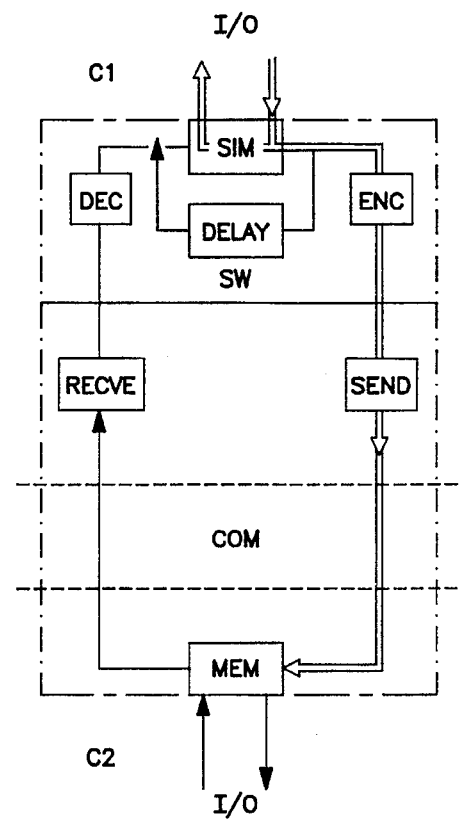
FIG. 2 shows FIG. 1 during an input and its transmission.

The appropriate figures are referred to in the following:

FIG. 1 and FIG. 2 show the schematic circuit diagram upon which the invention is based with the most important functions. FIG. 1 shows the information data flow (double line) for the real-time data image when no input is taking place at the operating station $C_1$. FIG. 2 shows the corresponding data flow during an input at the operating station $C_1$. The process is based on a software program SW (upper rectangle in dash-dot lines) for the operating station $C_1$ with data storage for real-time data MEM for each operative element. The real-time data MEM for the operating station $C_1$ correspond to an imaging of real-time data MEM in the control system $C_2$. Operating station $C_1$ is linked with the control system $C_2$ via a conventional device for communication COM (dividing line in dashes) so that real-time data MEM can be read out of the control system $C_1$ bidirectionally via a reception channel RECEIVE and the control system $C_2$ can be written into via a transmitting channel SEND. The type of transmission (hardware and software) has no bearing on the process and is therefore optional. The software program SW preferably includes a decoder DEC for converting (decoding, scaling) the received real-time data MEM and an encoder ENC for reconverting (coding, normalizing) the data to be transmitted.

The central part of the process is a program part which preferably has individual delay elements for all elements to be operated and the delay (DELAY) can be adapted according to the transmission time for the communication COM. A change in the data image via the input/output interface I/O of the operating station $C_1$ is detected by this program part and a simulation or forecast of the real-time data image is effected at the same time as the transmission of the input information in that the changed data are stored during the delay as simulated data SIM instead of the real-time data MEM. It is critically important that changes brought about by real-time data MEM from the control system $C_2$ do not lead to a simulation, i.e. the reception path and transmission path are separated by the program part so that no unwanted feedback can occur. The simulated data SIM are maintained until the transmission and response of the changed real-time data image are completed via the communication COM. The control system $C_2$ can also influence and, if necessary, dominate the real-time data image or portions thereof regardless of the inputs or simulations at the operating station $C_1$. After an input at the operating station $C_1$ and expiration of the delay, the real-time data image from the control system $C_2$ is automatically presented recurrently at the operating station $C_1$. In this way, a determined real-time data image or partial image can be influenced in two or more independent computer and/or control systems and can be made changeable into real time depending on behavior.

Figure 3:
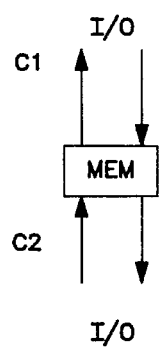
FIG. 3 is schematic representation of a dual-port RAM (Random Access Memory) in comparison to FIG. 1.

The entire system, including input/output interface I/O, real-time data MEM, operating station $C_1$, communication COM and control system $C_2$ (large rectangle in dash-dot lines) can be compared with a dual-port RAM according to FIG. 3. However, the process allows additional multi-user applications as described with reference to FIG. 7.

In comparison with FIGS. 1 and 2, FIG. 3 shows a schematic view of a dual-port RAM (Random Access Memory). The dual-port RAM is a storage module which can be accessed by two independent bus systems.

Figure 4A:
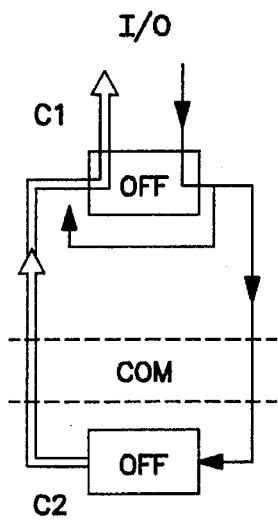
FIG. 4 shows the data flow with simultaneous flow a)→b)→c) during an input for controlling an engine which is accepted by the control system.
Figure 4B:
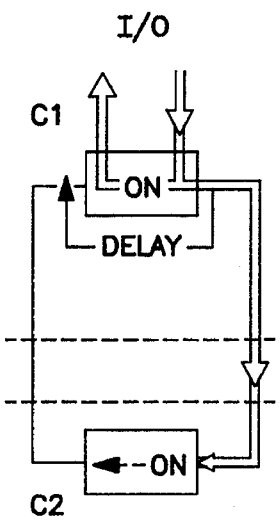
Figure 4C:
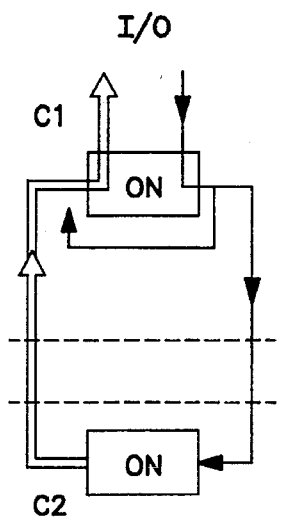
Figure 5A:
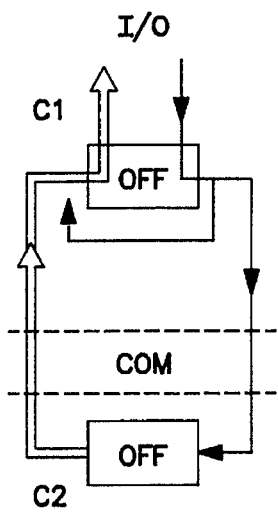
FIG. 5 shows FIG. 4 during an input for controlling an engine which is not accepted by the control system.
Figure 5B:
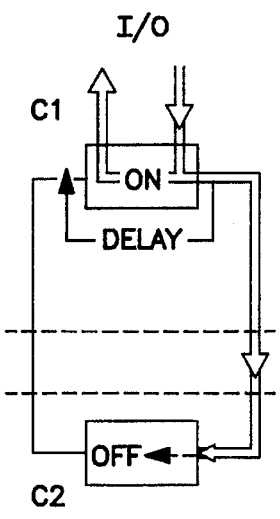
Figure 5C:
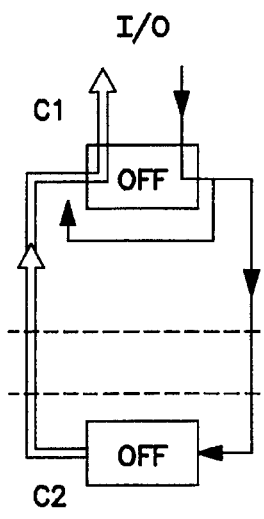
Figure 6D:
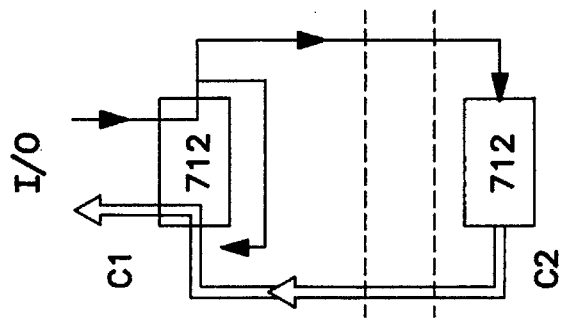
FIG. 6 shows the data flow with temporal flow a)→b)→c)→d) during an input of a reference value accepted by the control system and a subsequent automatic change in the reference value effected by the control system.
Figure 6C:
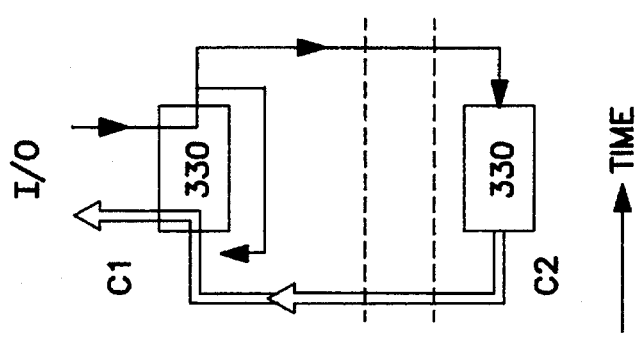
Figure 6B:
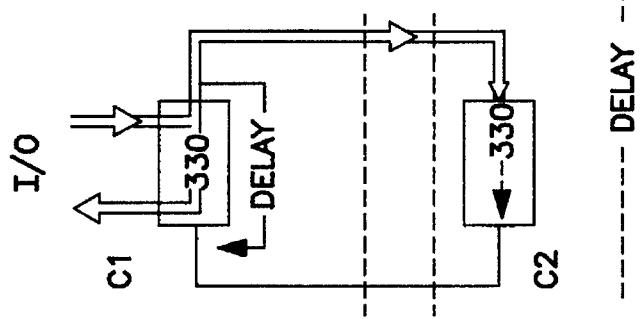
Figure 6A:
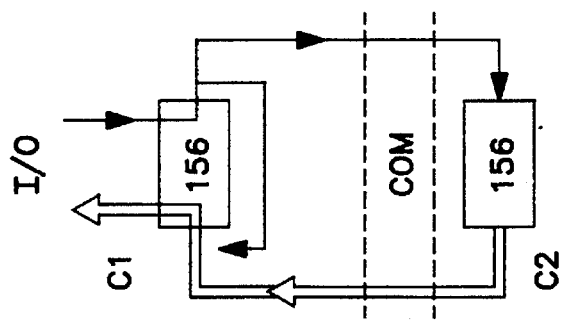

FIGS. 4 and 5 show a simplified example with temporal flow a)→b)→c) for the data flow (double line) for controlling and visualizing an engine. An engine is displayed for the ON and OFF states on the screen of the operating station $C_1$. The engine can be switched on or off at any time by the operating station $C_1$ as well as by the control system $C_2$ and the operator is always kept informed (in real time or with the delay time of the transmission) about the current status of the engine. As a rule, the control system $C_2$ dominates in that it allows or refuses the commands of the operating station $C_1$ by means of interlocking circuits.

a) Assuming the engine is turned off and no operation is presently being carried out, the input/output interface I/O is switched to reception via the software program described with reference to FIG. 1 and indicates the OFF status of the engine which is reported back.

b) In case of an input at the input/output interface I/O, transmission is switched on automatically and the display corresponds to the inputted command during the transmission and delay. Thus, if the operator wants to switch on the engine, the input command is sent via the software program of the engine and simultaneously displayed on the screen (simulated image). The operator now no longer needs to wait for the response from the control system $C_2$, he experiences an almost instantaneous, virtually reduced reaction.

c) After the expiration of the delay, the program automatically regenerates the initial position—the display is again "real". Depending on the interlocking circuit for the engine in the control system $C_2$, there are now two possibilities: in FIG. 4 the input command is accepted by the control system $C_2$ and displayed as real status after the expiration of the delay—the ON display persists. In FIG. 5 the input command is not accepted by the control system $C_2$. After the delay, the previous state is automatically displayed again—the system, so to speak, "corrects"the impermissible intervention automatically after the expiration of the transmission time and the ON display changes back to OFF.

In a manner similar to FIG. 4, FIG. 6 shows the data flow (double line) with temporal flow a)→b)→c)→d) when the operator changes a reference value from 156 to 330 and the control system $C_2$ accepts this change, and d) a subsequent increase in the reference value from 330 to 712 carried out by the control system $C_2$ itself, e.g. for a regulator with automatic reference-value management. Multiple-stage inputs, e.g. for start-ups with starting sequence echo (see FIG. 12), adjusting variables or limiting values are also processed in the same way: the operator always sees the current status of the installation and when striking a key immediately sees the status commanded by him without having to wait for the transmission reaction time.

Figure 7:
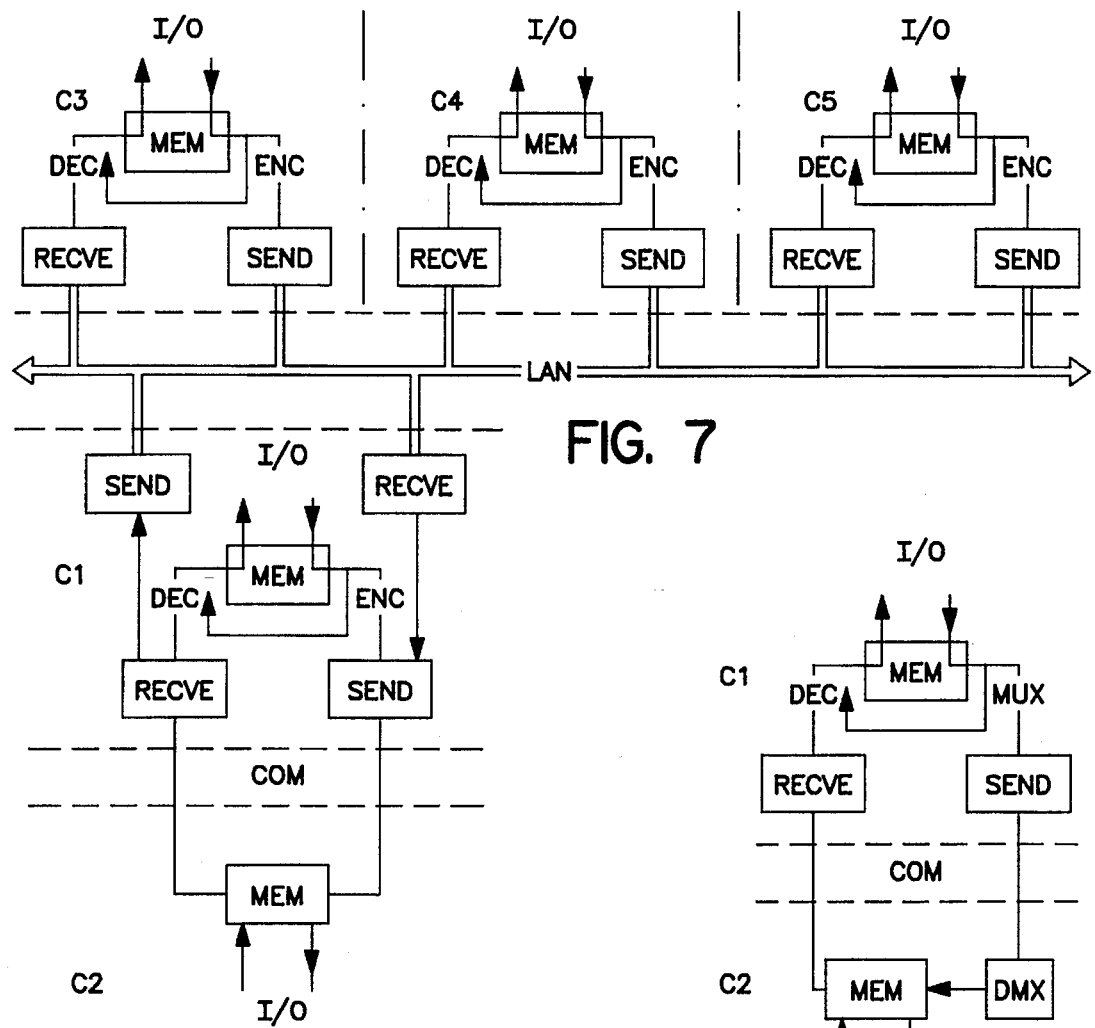
FIG. 7 shows a multiple application of the invention in an integrated network with the most important program elements of the individual stations.

FIG. 7 shows a multiple application of the invention in the integrated network with the most important program elements in the individual stations. In the example, the operating station $C_1$ is linked with three other operating stations $C_3$, $C_4$, and $C_5$ within a local area network LAN via reception channels RECEIVE and transmission channels SEND. The operating station $C_1$ is linked with the control system $C_2$ as described with reference to FIG. 1. Of course, other configurations are also possible, e.g. the control system $C_2$ could also be linked directly with the local area network LAN or there could be no control system $C_2$ at all for a realtime data exchange in a network system.

As was described with reference to FIG. 1, all four operating stations $C_1$, $C_3$, $C_4$ and $C_5$ allow an influencing of the real-time data image with corresponding local simulation at the input/output interface I/O of the currently operating station. In so doing, data images can be changed at all operating stations simultaneously. The most recent input dominates. The non-operating stations automatically receive the new real-time data image without simulation according to the normal transmission. In so doing, it is also possible that a partial image is just received and displayed as a real-time data image, whereas another portion of the same image appears as a simulated image. Regardless of the inputs or simulations at the operating stations, the control system $C_2$ can also influence and, as the case may be, absolutely dominate the real-time data image at any time.

In this way, a real-time data image or partial image can be influenced in a plurality of independent computer and/or control systems and changed in real time depending on behavior. The process therefore supports multi-user applications and requires no so-called record locking for the real-time data image, since the most recent allowed intervention always has validity.

Further, a redundant directing system can also be constructed in this way in that a control unit can transmit from a plurality of operating/monitoring stations via independent (redundant) communication links.

Figure 8:
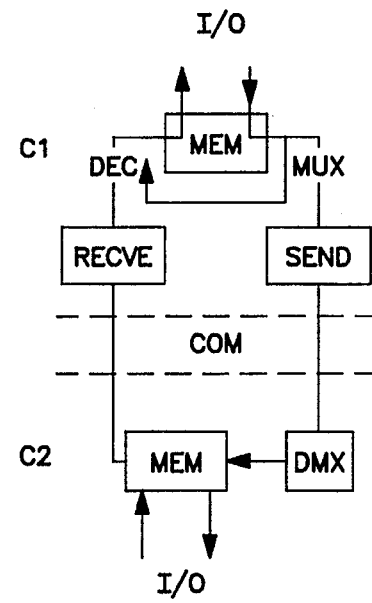
FIG. 8 shows an application of the invention for so-called multiplexed writing with the most important program elements for the operating station and control system.

FIG. 8 shows an application of the invention for so-called multiplexed writing with the most important program elements for the operating station $C_1$ and control system $C_2$. The encoder ENC in FIG. 1 is expanded to form a multiplexer MUX. The multiplexer makes multiple use of a transmission channel or storage location and relieves the system in that all data to be transmitted are generated and transmitted only during operation, i.e. at the time the data are actually occurring. Access to the real-time data MEM in the control system $C_2$ is no longer controlled by the communications protocol, but rather is effected with a demultiplexer DMX in the control system $C_2$ itself.

Figure 9:
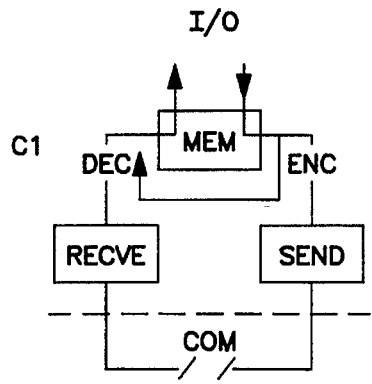
FIG. 9 shows an application of the invention for test purposes with interrupted data flow.

FIG. 9 shows an application of the invention for test purposes with interrupted data flow. Since the system automatically "corrects" an intervention on the part of the operator at the input/output interface I/O after the expiration of the delay, an interrupted data flow results in the behavior described with reference to FIG. 5. A communication COM which is interrupted or deliberately not put into operation is therefore suitable for the testing of applications and communications data without control system $C_2$ in that actions are input in the input/output interface I/O and briefly simulated.

Figure 10:
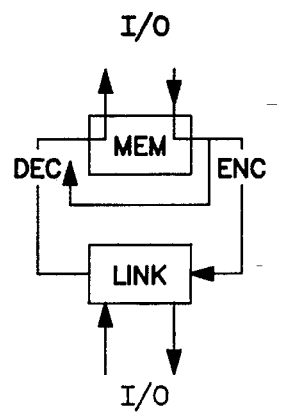
FIG. 10 shows an application of the invention as a so-called internal encoder/decoder with short-circuited data flow.

FIG. 10 shows an application of the invention with internally short-circuited data flow as so-called encoder/decoder. Direct feedback LINK of the data flow from the encoder ENC to the decoder DEC with corresponding access to the coded data provides a kind of dual-port RAM according to FIG. 3 with internal data converter and the data can be converted forwards as well as backwards, for example, scaling <- - -> normalizing or decoding <- - -> encoding. The following code table Tab. 1 shows a possible data conversion.

Figure 11:
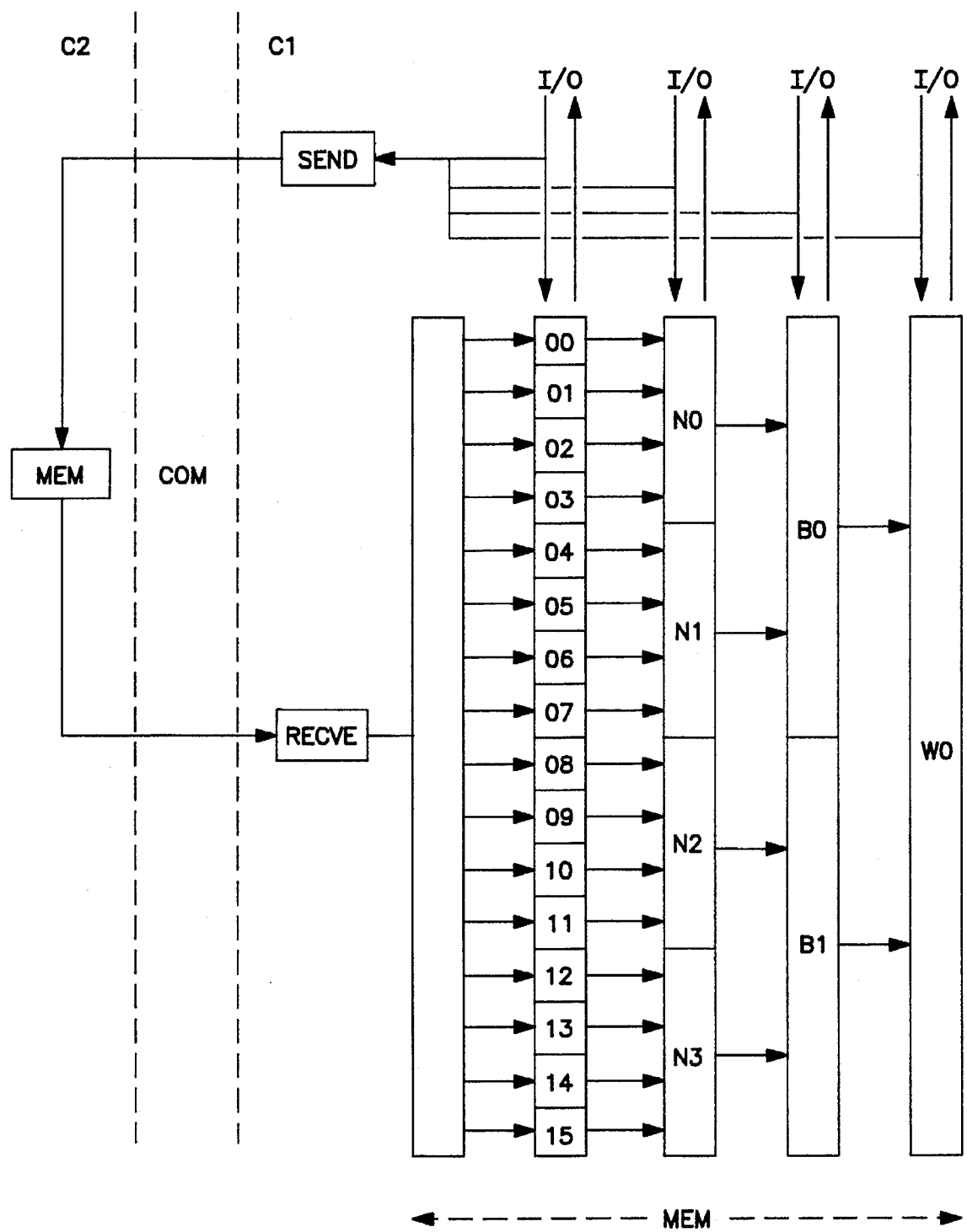
FIG. 11 an application of the invention with data flow for a multiple decoder/encoder program.
Figure 13:
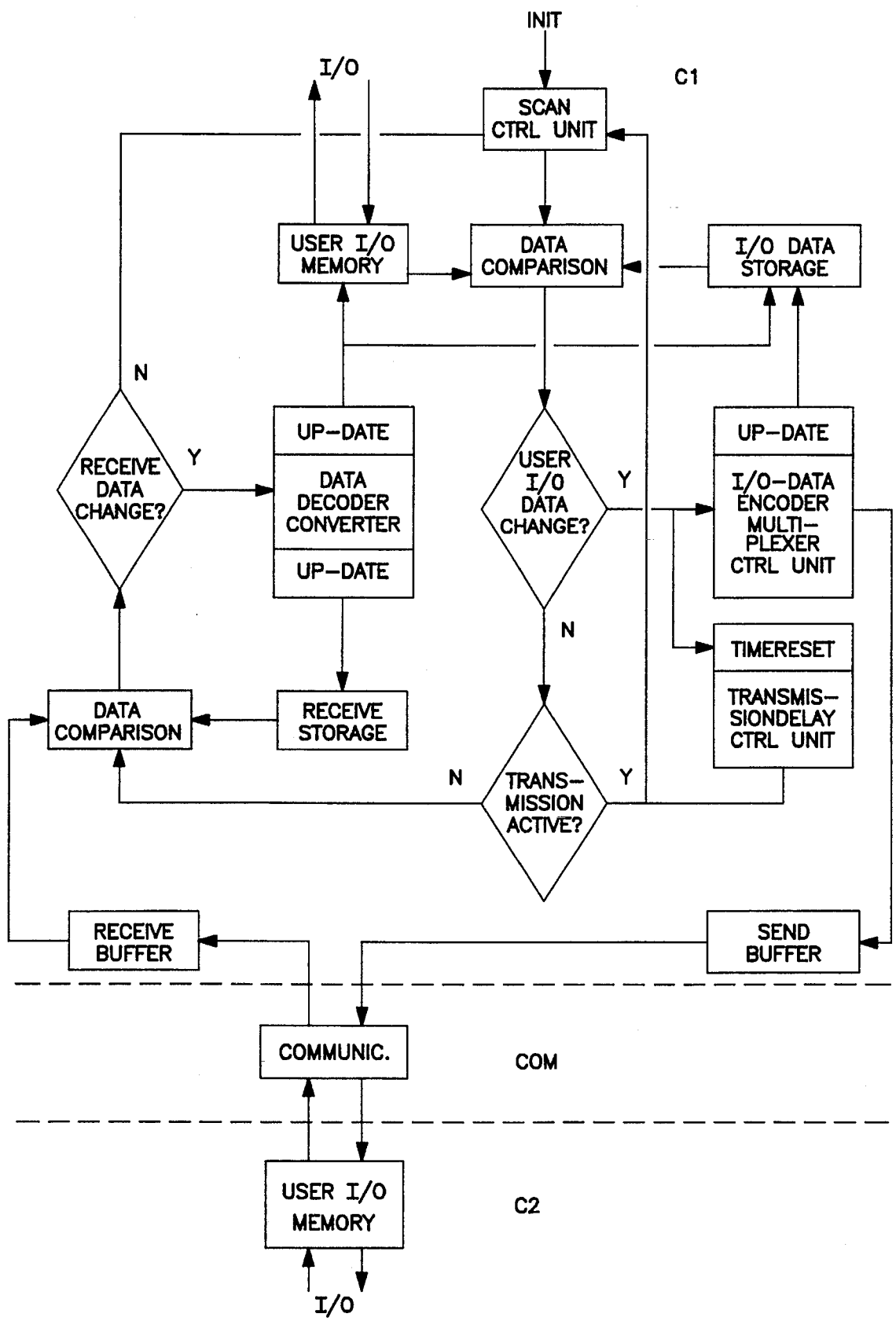
FIG. 13 shows the simplified flow chart of the program and simulating means for an individual data point.
Figure 14:
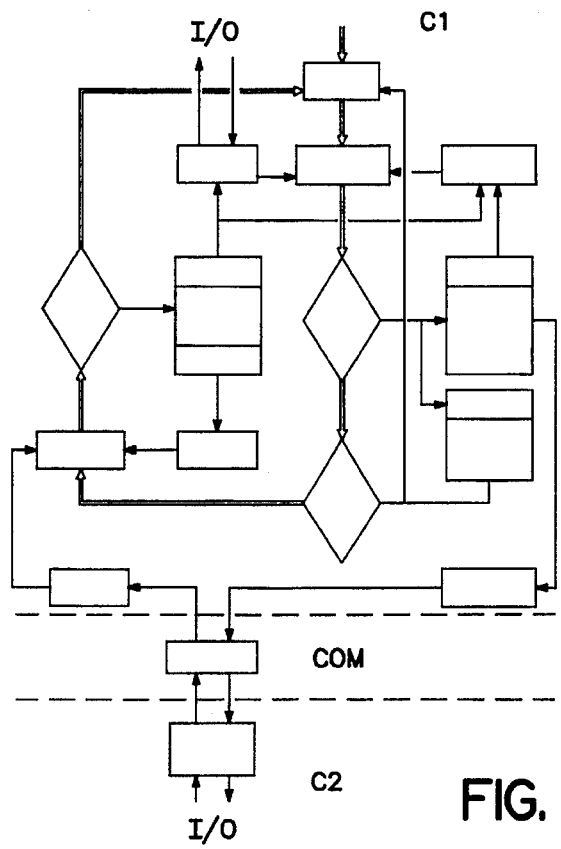
FIG. 14 shows the simplified flow chart of FIG. 13 with the function sequence (double line) when no I/O input/output changes are taking place (send)
Figure 15:
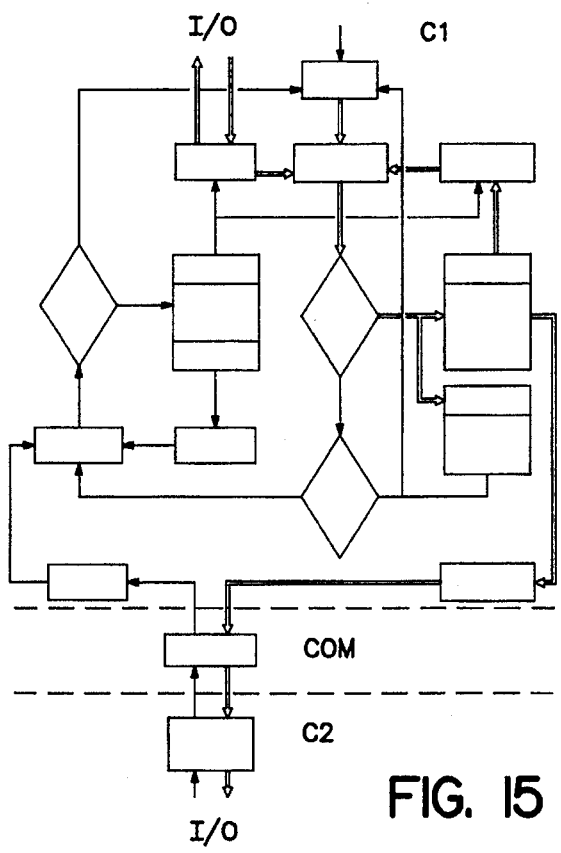
FIG. 15 shows the simplified flow chart of FIG. 13 with the command/monitoring station (send)
Figure 16:
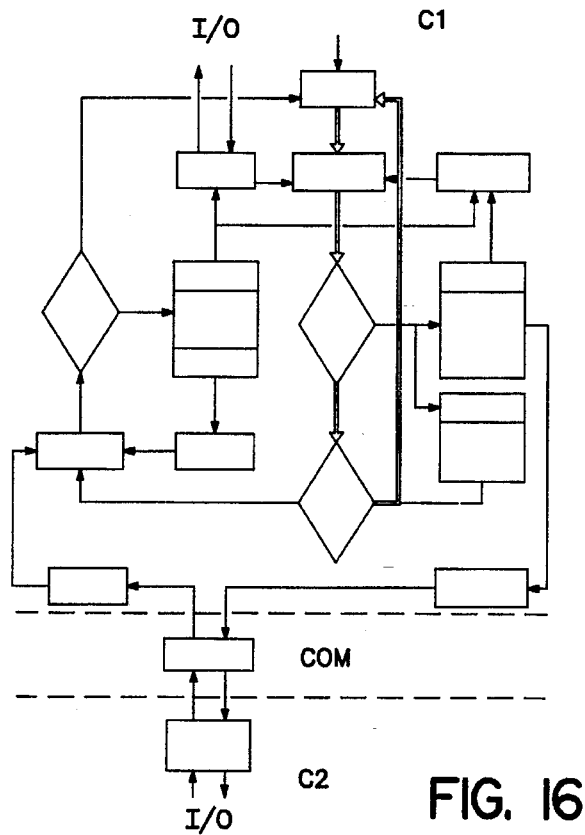
FIG. 16 shows the simplified flow chart of FIG. 13 with the function flow (double line) after an input change in the command/monitoring station during the transmission (transmission)
Figure 17:
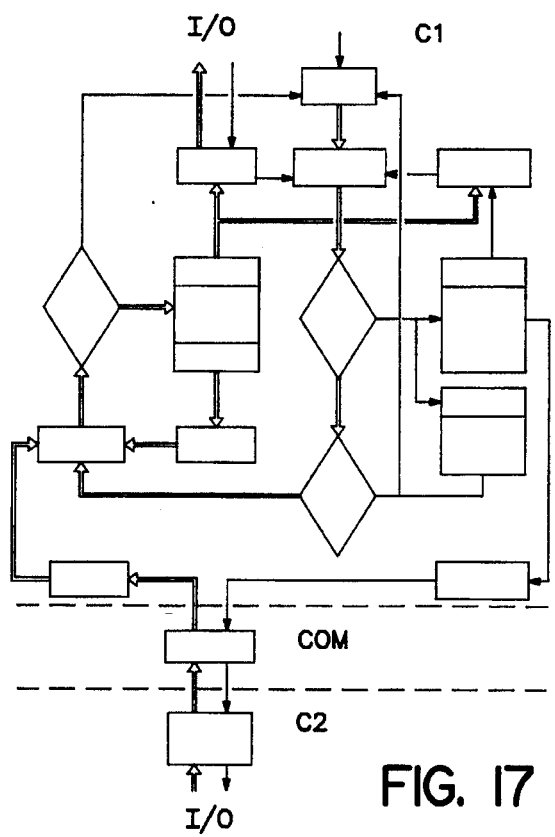
FIG. 17 shows the simplified flow chart of FIG. 13 with the function flow (double line) during a change in the reception data in the command/monitoring station (receive).

FIG. 11 shows an application of the invention with data flow for a multiple decoder/encoder program. In this case, a 16-bit word is "dissected" into bits 00 . . . 15, nibbles NO . . . N4, bytes B0..B1 and again into a word WO and inputted or displayed at the input/output interface I/O. All elements can be used as real-time data MEM according to the description with reference to FIG. 1. A control system $C_2$ generally has direct access to individual words, bytes and bits. Accordingly, 16-bit states or e.g. two measurement values can be transmitted as bytes with a single word and influenced from both sides. The following code table Tab. 1 shows further demonstrations of a possible data type conversion.

TABLE 1

Code table for data type conversion

| encoded form | <— ENC/DEC —> | decoded form |
|---|---|---|
| data word containing sixteen individual bit states 15 to 00<br>16 bits<br>Bit 15 . . . 0 | code<br><— 00 . . . 15 —> | 16 individual detectable digital elements<br>bit<br>log "1" or "0" |
| data word containing four nibbles<br>N3  N2  N1  N0<br>4 nibbles<br>bit . . . 12  . . . 8  . . . 4  . . . 0 | code<br><— N0 . . . N3 —> | 4 individual detectable analog elements<br>nibble<br>0 . . . 15 |
| data word containing two bytes (signed or unsigned)<br>BH/B1  BL/B0<br>±hibyte  ±lobyte<br>bit 15 . . . 8  7 . . . 0 | code<br><— B0 or B1 —><br><— BL or BH —> | 2 individual detectable analog elements<br>byte signed<br>−128 . . . +127<br>or unsigned<br>0 . . . 255 |

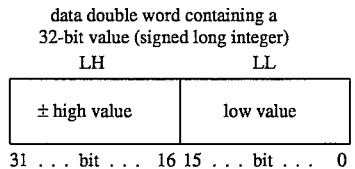

data double word containing a
32-bit value (signed long integer)

individual detectable analog element long: $\pm 2.14 \times 10^9$, code LL+LH

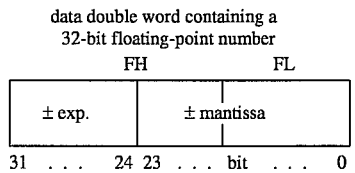

data double word containing a
32-bit floating-point number individual detectable analog element float: $\pm 3.4 \times 10^{38}$, code FL+FH

Figure 12:
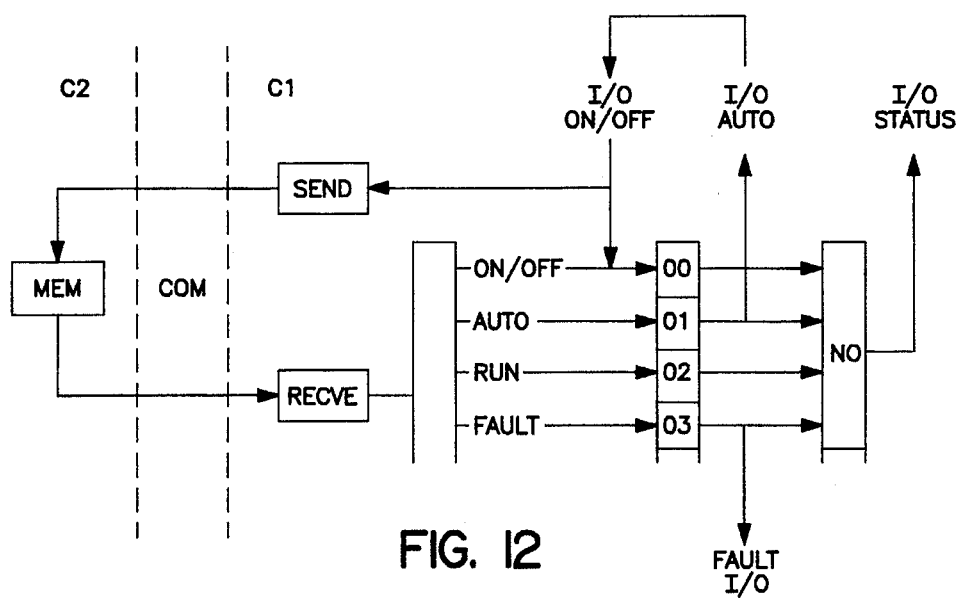

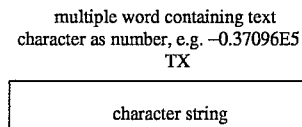

multiple word containing text character as number, e.g. −0.37096E5 TX individual detectable analog element float: $\pm 1.7 \times 10^{308}$, code TX FIG. 12 shows an application of the invention according to the description for FIG. 11 with data flow for the direct decoding/encoding of a nibble (4-bit analog value) for displaying the status of installations on the screen. In so doing, an installation status STATUS is displayed in the form of a nibble NO according to the following truth table Tab. 2.

TABLE 2

Truth table for nibble:

| FAULT bit 03 | RUN bit 02 | AUTO bit 01 | ON/OFF bit 00 | STATUS NO | INSTALLATION STATUS SCREEN DISPLAY |
|---|---|---|---|---|---|
| 0 | 0 | 0 | 0 | 0 | standby |
| 0 | 0 | 0 | 1 | 1 | start |
| 0 | 0 | 1 | 0 | 2 | standby automatic |
| 0 | 0 | 1 | 1 | 3 | start automatic |
| 0 | 1 | 0 | 0 | 4 | stop |
| 0 | 1 | 0 | 1 | 5 | run |
| 0 | 1 | 1 | 0 | 6 | stop automatic |
| 0 | 1 | 1 | 1 | 7 | run automatic |
| 1 | 0 | 0 | 0 | 8 | error |
| 1 | 0 | 0 | 1 | 9 | error start |
| 1 | 0 | 1 | 0 | 10 | error automatic |
| 1 | 0 | 1 | 1 | 11 | error automatic start |

For example, the display status STATUS can be animated with different colors or symbols on the screen and is composed of four pieces of bit information 00 . . . 03, where bit 00 simultaneously constitutes the on/off command ON/OFF and bit 03 can be further processed as error message. The on/off command ON/OFF can be interlocked, if necessary, with the AUTO release bit 01 in the operating station $C_1$, i.e. operation via the input/output interface I/O will only be accepted when the control system $C_2$ has previously permitted the corresponding AUTO release.

When the input at the input/output interface I/O is accepted, the input/output command ON/OFF is fed to the transmission channel SEND as well as to the corresponding BIT 00 and accordingly to the nibble NO for immediate STATUS display. Thus when striking a key the operator sees, for example, the simulated status "start automatic" which, insofar as the control system $C_2$ allows the command, becomes the real-time data image after the transmission time and later changes to "run automatic" or e.g. "error automatic start" depending on the further progress of the processing process (compare also description for FIG. 6).

While the foregoing descriptions and drawings represent the preferred embodiments of the present invention, it will be obvious to those skilled in the art that various changes and modifications may be made therein without departing from the true spirit and scope of the present invention.

What is claimed is:

1. A method for bidirectional data exchange between a command/monitoring station and one or more units to be controlled, comprising:

storing operating parameter data from the unit or units as a real-time data image in the command/monitoring station;

entering a control command into the command/monitoring station;

changing the real-time data image in the command/monitoring station in response to the control command by producing a simulated data image of the real-time data image;

transmitting control command data corresponding to the change in the real-time data image from the command/monitoring station to a unit to be controlled;

maintaining the simulated data image in the command/monitoring station during a delay period, the delay period corresponding to a transmission time for transmitting the control command data from the command/monitoring station to the unit to be controlled and for transmitting operating parameter data from the unit back to the command/monitoring station;

transmitting operating parameter data from the unit to be controlled back to the command/monitoring station; and updating the real-time data image in the command/monitoring station with operating parameter data from the unit or units after expiration of the delay period.

2. The method of claim 1, wherein the step of storing operating parameter data as a real-time data image further comprises the step of:

storing the operating parameter data of the unit or units in the command/monitoring station at a storage location that is identical to a storage location for the control command data effecting in response the corresponding operating parameter data in the unit or units.

3. The method of claim 2, further comprising the step of:

storing the simulated data image in the command/monitoring station at a storage location that is identical to a storage location for the real-time data image.

4. The method of claim 1, wherein the step of storing operating parameter data as a real-time data image further comprises the step of:

storing the operating parameter data from the unit or units as partial data images of one or more data points in the command/monitoring station;

wherein the real-time data image is made up of the data points from the partial data images.

5. The method of claim 1, further comprising the step of:

updating the simulated data image in the command/monitoring station with operating parameter data from the unit or units during the delay period except for data that has been changed in the real-time data image as a result of the control command.

6. The method of claim 1, further comprising the steps of:

encoding the control command data that is transmitted from the command/monitoring station to the unit to be controlled; and decoding the operating parameter data that is transmitted from the unit back to the command/monitoring station.

7. The method of claim 1, further comprising the steps of:

displaying the simulated data image in the command/monitoring station during the delay period; and displaying the updated real-time data image in the command/monitoring system after expiration of the delay period.

8. A system for bidirectional data exchange between a command/monitoring station and one or more units to be controlled, comprising:

a data storage for storing operating parameter data from the unit or units as a real-time data image in the command/monitoring station;

means for entering a control command into the command/monitoring station;

means for changing the real-time data image in the command/monitoring station in response to the control command by producing a simulated data image of the real-time data image;

transmission means for transmitting control command data corresponding to the change in the real-time data image from the command/monitoring station to a unit to be controlled and for transmitting operating parameter data from the unit back to the command/monitoring station;

means for maintaining the simulated data image in the command/monitoring station during a delay period, the delay period corresponding to a transmission time for transmitting the control command data from the command/monitoring station to the unit to be controlled and for transmitting operating parameter data from the unit back to command/monitoring station; and means for updating the real-time data image in the command/monitoring station with operating parameter data from the unit or units after expiration of the delay period.

9. The system of claim 8, wherein the data storage stores the operating parameter data of the unit or units in the command/monitoring station at a storage location that is identical to a storage location for the control command data effecting in response the corresponding operating parameter data in the unit or units.

10. The system of claim 9, further comprising:

second data storage for storing the simulated data image in the command/monitoring station at a storage location that is identical to a storage location for the real-time data image.

11. The system of claim 8, wherein the data storage stores the operating parameter data from the unit or units as partial data images of one or more data points in the command/monitoring station; and wherein the real-time data image is made up of the data points from the partial data images.

12. The system of claim 8, further comprising:

means for updating the simulated data image in the command/monitoring station with operating parameter data from the unit or units during the delay period except for data that has been changed in the real-time data image as a result of the control command.

13. The system of claim 8, wherein the transmission means further comprises:

means for encoding the control command data that is transmitted from the command/monitoring station to the unit to be controlled; and means for decoding the operating parameter data that is transmitted from the unit back to the command/monitoring station.

14. The system of claim 8, wherein the real-time data image is produced for building control.

15. The system of claim 8, wherein the real-time data image is produced for industrial control.

16. The system of claim 8, further comprising:

display means for displaying the simulated data image in the command/monitoring station during the delay period, and for displaying the updated real-time data image after expiration of the delay period.

* * * * *